Aug. 19, 1958  A. CHIANTELASSA  2,848,139
MIXING AND DOSAGE MACHINE FOR TWO OR MORE FLUIDS
Filed Dec. 16, 1953  3 Sheets-Sheet 1
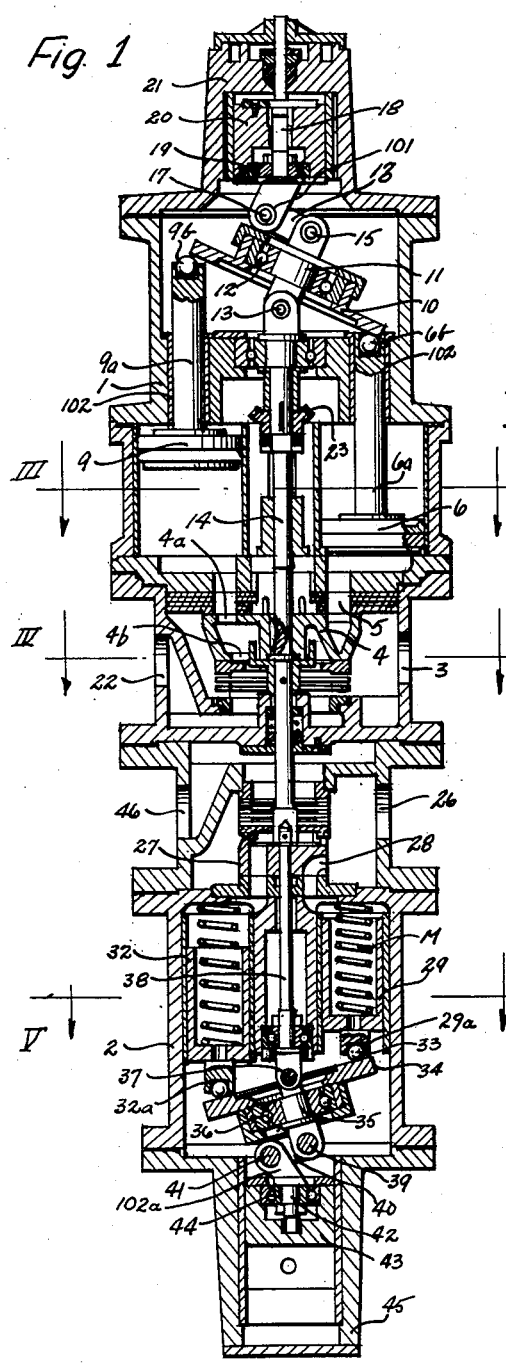
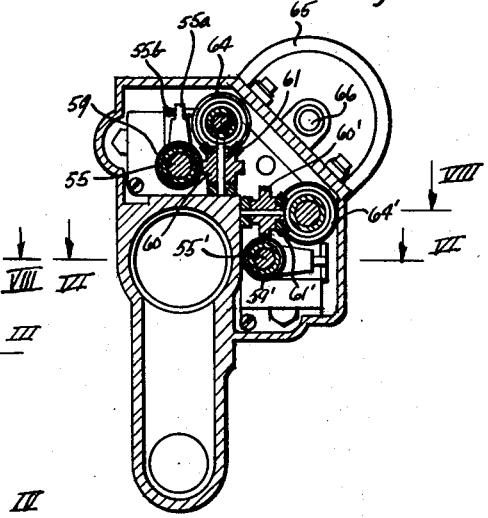
INVENTOR
Attilio Chiantelassa
BY A. John Michel
ATTORNEY Aug. 19, 1958  A. CHIANTELASSA  2,848,139
MIXING AND DOSAGE MACHINE FOR TWO OR MORE FLUIDS
Filed Dec. 16, 1953  3 Sheets-Sheet 2

INVENTOR
Attilio Chiantelassa
BY A. John Michel
ATTORNEY

Aug. 19, 1958  A. CHIANTELASSA  2,848,139
MIXING AND DOSAGE MACHINE FOR TWO OR MORE FLUIDS
Filed Dec. 16, 1953  3 Sheets-Sheet 3
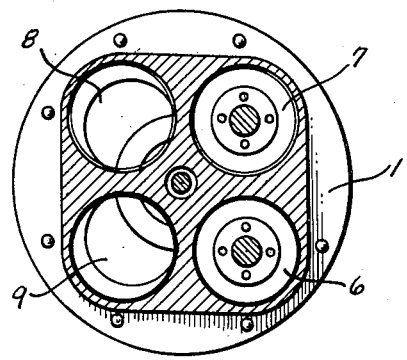
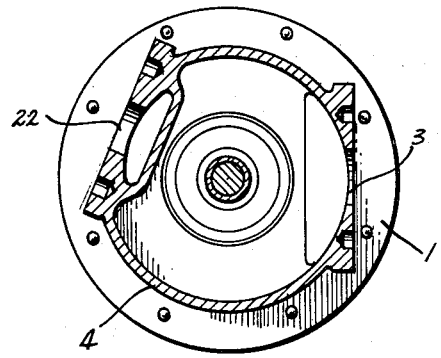
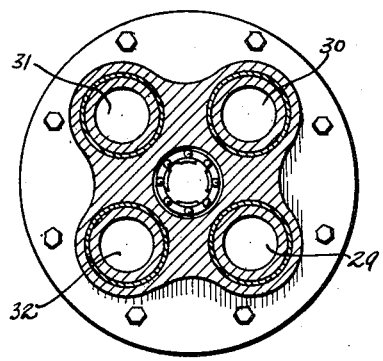
INVENTOR
Attilio Chiantelassa
BY
ATTORNEY

United States Patent Office 2,848,139
Patented Aug. 19, 1958

2,848,139
MIXING AND DOSAGE MACHINE FOR TWO OR MORE FLUIDS

Attilio Chiantelassa, Turin, Italy

Application December 16, 1953, Serial No. 398,603

Claims priority, application Italy December 16, 1952

4 Claims. (Cl. 222—26)

The present invention relates to machines for simultaneously metering two or more fluids.

It is the principal object of this invention to provide a machine of this type which enables two fluids to be metered at any required ratio and with such accuracy as cannot be obtained with like machines heretofore known. Such machines are used commercially, for instance, to produce gasoline-oil mixtures for motor scooters.

The main difficulty with known machines of this type resides in the considerable inaccuracy in measuring fluid output. Such inaccuracies may, in the above-cited example, for instance, due to a change in the oil viscosity, lead to a high and non-acceptable percentage of oil in the mixture and, generally, to such mixture variations which may affect the normal running of the engines in which the mixtures are used.

The metering machine of the present invention completely obviates the above disadvantages by metering the fluids in a volumetric measuring device fitted with several pistons operatively connected to a tilting or swash plate whose tilt is micrometrically adjustable to regulate the piston stroke while successive deliveries of each measuring device are gaged before the fluid enters the mixing chamber and are finally totalized on a suitable meter.

The tilting of the plates can be regulated without stopping the machine and, most importantly, without play so that the fluid deliveries will be constant.

The above and other features, objects and advantages of the invention will be more fully explained in the following description of an embodiment thereof, taken in conjunction with the accompanying drawing wherein Fig. 1 is a vertical section of a metering machine for two different fluids, for instance gasoline and oil;

Fig. 3 is a cross section along line III—III of Fig. 1;

Fig. 4 is a cross section along line IV—IV of Fig. 1;

Fig. 5 is a cross section along line V—V of Fig. 1;

Fig. 6 is a vertical section of the oil measuring device along line VI—VI of

Figure 6:
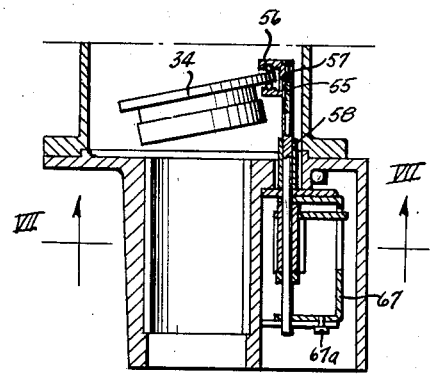
Figure 8:
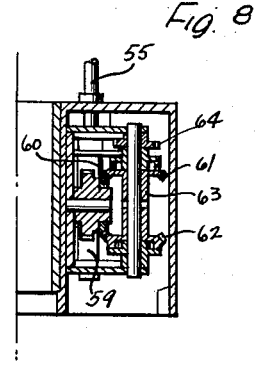

Fig. 7 which is a cross section of the device of Fig. 6 along line VII—VII;

Fig. 8 is a vertical section of the same device along line VIII—VII of Fig. 7; and Fig. 9 is a cross section of the arrangement for one-way rotation of the gearing in the device of Fig. 6.

Referring now to the drawing, there are shown measuring devices 1 and 2 coupled together, the upper device 1 being used to meter gasoline and the lower one 2 for metering oil. Gasoline is delivered to meter 1 under normal pressure through a single wide inlet opening 3. A distributor 4 provided with passages 4a and 4b is rotatably mounted on a platform having inlets 5 communicating with four small cylinders equally spaced from one another in the fixed outer wall of meter 1. Liquid-tight pistons 6, 7, 8 and 9 are axially reciprocably mounted in respective ones of these cylinders on piston rods 6a, 7a, 8a and 9a which are non-rotatable and guided for reciprocation in sleeves 102. Each piston rod carries a respective ball bearing 6b, 7b, 8b and 9b at its outer end, the tilting, skew or swash plate 10 being engaged by the ball bearings.

The swash plate 10 is rotatably mounted on hub 11 by means of ball bearings 12, the hub being pivoted at 13 to central control shaft 14. The distributor 4 is suitably secured to the shaft 14 whereby it rotates with the latter. The other end of the hub is pivoted at 15 to an equalizing rocker arm 16. The rocker arm is, in turn, pivoted at 17 to intermediate link 101 connected to axially reciprocable shaft 18 which is rotatable on bearings 19. The bearing member 20 may be fastened to cap 21 rigidly or removably by any suitable means.

The control or driving shaft 14 of meter 1 carries gear 23 meshing with a similar bevel gear 24 (see Fig. 2) mounted on small shaft 25.

In the embodiment shown, the swash or tilting plate 10 is pre-set at a desired inclination so that gasoline will be discharged from the meter 1 at a constant flow rate which depends on the pre-set inclination.

Meter 1 operates as follows:

Gasoline entering through inlet 3 under pressure flows in succession into each of the small cylinders housing pistons 6—9, respectively, as rotating distributor passages 4a, 4b register with successive ones of openings 5 leading to the cylinders. As the gasoline flows into a cylinder, its pressure raises the respective piston, i. e. 6, thus forcing the connected piston rod upwardly and pivoting swash plate 10 about pivot 13, causing the control shaft 14 to rotate since the shaft is connected to the rotating swash plate. The plate 10 is rotated about a vertical axis by the ends of engaging ends of the piston rods.

At the same time, the remaining pistons, i. e. 9, will be pressed downwardly by the pressure of revolving swash plate 10 since the same is pivoted downwardly at one side simultaneously with being moved upwardly at the opposite side. The downward movement of the piston will force the gasoline in its cylinder to flow through corresponding opening 5 and passages 4a, 4b toward the single outlet opening 22 mounted on the opposite side of the wall from inlet 3.

Since there are more than three small cylinders, each turn of shaft 14 will correspond to one operative stroke of at least one piston and as much gasoline will be ejected as corresponds to the displacement of one of the cylinders. In other words, the assembly operates like a two-stroke engine. Through meshing gears 23, 24 which are keyed to shaft 14 and shaft 25, respectively, the two shafts will rotate synchronously. The shaft 25 leads to a totalizing device of known type (not shown).

As will be clear from the drawing, the fluid-tight pistons act solely as fluid seals while the axial reciprocation is effected by the piston rods guided in sleeves 102. This arrangement will save wear and tear on sealing means, such as washers and the like, provided on the pistons.

Oil meter 2 forms the lower portion of the machine and is the exact kinematic replica of meter 1, the details of certain elements differing as will be described hereinafter.

Oil is delivered to meter 2 by inlet opening 26 and flows into successive ones of small cylinders housing pistons 29, 30, 31 and 32 through passages 28 in rotating distributor 27. The pistons are rigidly connected to respective piston rods 29a, 30a, 31a and 32a which carry ball bearings 33 at their outer ends, the bearings engaging swash or tilting plate 34. The swash plate is rotatably mounted on bearings 36 mounted on hub 35 which is pivoted at 37 to control shaft 38 and at 39 to equalizing rocker arm 40 which, in turn, is pivoted at 41 to intermediate link 102a connected to pivot 42. Pivot 42 is rotatably but non-slidably mounted in head 43 by means of ball bearings 44. Head 43 is slidably mounted in a sleeve in cap 45 but is held against rotation therein, as will be more fully explained hereinafter.

Shaft 38 is rigidly interconnected with shaft 14 and the two shafts rotate in unison.

Similarly to the gasoline flow from inlet 3 to outlet 22, the oil entering at inlet 26 will be forced from successive cylinders through corresponding passages 28 of the rotating distributor 27 operated by shaft 38 to which it is rigidly connected, leaving the meter 2 through outlet 46 at the opposite side of inlet 26.

Therefore, the fluid output of the first meter will be mixed with that of the second meter in a proportion corresponding to the fluid volumes delivered by the reciprocating pistons, the reciprocating stroke thereof depending on the pre-set tilt of plates 10 and 34.

In the illustrated embodiment, head 20 is fixed to cap 21 so that the gasoline output remains constant, as hereinabove explained. The output of oil may, on the other hand, be continuously varied, as will now be described.

Figure 2:
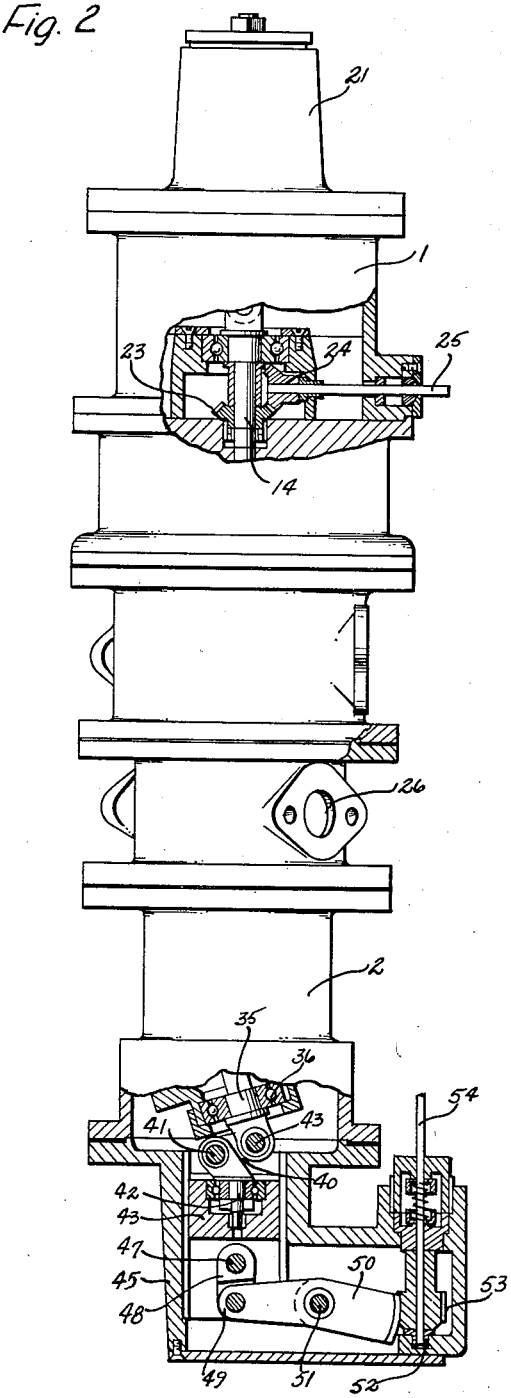
Fig. 2 is a side elevational view, with parts broken away, of the machine of Fig. 1, the bottom portion being shown at an angle of 45° in respect to the upper portion to make the operation more readily understandable.

As will be clear, a variation in output depends on a corresponding change in the swash plate tilt. Accordingly, as shown in Fig. 2, means is provided for adjusting the tilt of plate 34.

The adjustment may be effected at any time from the outside of the machine by manually turning shaft 54, whereby the tilt of swash plate 34 may be micrometrically adjusted. As illustrated, shaft 54 carries worm screw 53 meshing with grooved quadrant 52 provided at one end of lever 50 rocking on pivot 51. The other end of lever 50 is pivoted at 49 to equalizing rocker arm 48 which is mounted on pin 47 journaled in head 43.

When shaft 54 is rotated, gearing 52, 53 will rock lever 50 about pivot 51, thus raising or lowering pin 47 and head 43 to which the pin is fixedly connected. Thus, by altering the position of head 43 and pivot 42, the tilt of plate 34 is correspondingly changed to adjust the fluid output delivered by pistons 29—32. The equalizing rocker arms 40 and 48 will absorb any possible change in the angle of tilt of plate 34 so that the swash plate remains at the adjusted constant tilt angle.

Figs. 6–9 illustrate the totalizing device for the oil output. Two push rods 55 and 55' with forked terminals 56 engage the periphery of swash plate 34, point contact being established between the forked terminals and the plate periphery by ball bearings 57 mounted on opposite sides of the plate between the plate and the fork walls. Due to the constant oscillation of plate 34 during rotation of control shaft 38, the push rods will be reciprocated in their bearings 58.

The push rods are provided with toothed rack portions 59 and 59' which impart a reciprocating oscillation to drums 60 and 60', respectively, each drum comprising a cylindrical gear engaging the respective rack portion and bevel gears. A bevel pinion which is integral with the cylindrical gear imparts an oscillation in the opposite direction to one of the two bevel gears 61 and 62 which are mounted on stem 63 by means of freely rotating wheels. Thus, during downward travel, the motion is transferred to stem 63 from pinion 62 while pinion 61 rotates idly and cylindrical wheel 64, which is keyed to stem 63, rotates in the opposite direction. When push rod 55 (or 55') moves upwardly, pinion 62 idles while pinion 61 meshes and continues to drive shaft 63 and wheel 64 in the above-named opposite direction. Thus, both wheels 64 and 65 which are intermeshed accomplish one rotation which is proportional to the plate tilt angle and, therefore, to the piston stroke. Shaft 66 of gear wheel 65 is connected to a conventional meter.

To avoid errors due to mechanical play of the push rod, two such rods (55 and 55') are provided spaced 90° from each other (Fig. 7). In this way, gear wheel 65 will be operated successively by one of the four pinions 61, 61', 62 and 62'.

The mounting and operation of push rods 55 and 55' are identical and the respective elements are indicated by the same reference numerals, except that the parts belonging to rod 55' are primed.

This arrangement will provide a substantially constant rotary motion of shaft 66, thus assuring accurate measurement of the oil flow through meter 2.

The measuring device is adjustable to make volumetric capacity correspond with the rotations of shaft 66 since rack 59 is revolvably mounted on rod 55. Rotation of the rack is obtained by operating registration pin 67. Arm 55A is integral with push rod 55 and toothed rack 59, the end of the arm projecting into hole 55B bored into pin 67. The pin may be set by wing screw 67A. An eccentricity variation is obtained by rotating forked terminal 56 in its guide so that the distance of balls 57 from the axis of rotation is changed.

As no play is present between plate 34 and balls 33, aided by springs M (Fig. 1) acting on the pistons, the metering is most accurate.

While only meter 2 has been shown adjustable for changing the oil output, it is obvious that meter 1 could be provided with similar or different adjustment means for changing the tilt angle of plate 10 during operation.

Variations of details may obviously be effected in the metering machine without departing from the principles of the invention. Thus, for instance, the output of one of the fluids may be reduced to nothing merely by tilting the respective swash plate to a horizontal position. In such case, the device would operate merely to meter a single fluid.

What I claim is:

1. An apparatus for metering a plurality of liquids, comprising a separate liquid metering and delivering device for each liquid, each device including a plurality of cylinders, a reciprocable piston mounted in each cylinder, a shaft for each of said devices mounted centrally therein and about which shaft said cylinders are equidistantly disposed, a swash plate mounted on the shaft and coupling said pistons together, inlet means for supplying the respective liquid to successive ones of said cylinders and outlet means for receiving the liquid from successive ones of said cylinders, means for measuring each delivered liquid, means for coupling the central shafts of said devices together, and means for adjusting the angle of tilt of the swash plate of at least one device to vary the stroke of its pistons.

2. The apparatus of claim 1, comprising an axle rotatably mounting said swash plate, means for pivotably connecting one end of said axle to the central rotating shaft, means for pivotably connecting the other axle end to a rocking arm, a longitudinally reciprocable rod for supporting said rocking arm, and means for micrometrically controlling the longitudinal position of the rod whereby the tilt of the swash plate may be regulated.

3. The apparatus of claim 1, comprising at least two superposed ones of said liquid delivering devices in axial alignment with each other.

4. The apparatus of claim 1, comprising a shaft arranged at a right angle to said central shaft, gear means for operatively connecting said shafts, and means for metering the revolutions of the latter shaft.

References Cited in the file of this patent

UNITED STATES PATENTS

| | | |
|---|---|---|
| 595,942 | Diehl | Dec. 21, 1897 |
| 1,345,614 | Manker | July 6, 1920 |
| 1,648,000 | Lee | Nov. 8, 1927 |
| 1,860,278 | Eckels | May 24, 1932 |
| 2,531,202 | Deschamps | Nov. 21, 1950 |
| 2,633,802 | Parilla et al. | Apr. 7, 1953 |